United States Patent
Yadlin et al.

(10) Patent No.: US 11,818,275 B2
(45) Date of Patent: *Nov. 14, 2023

(54) TECHNIQUES FOR SECURING APPLICATION PROGRAMMING INTERFACE REQUESTS USING MULTI-PARTY DIGITAL SIGNATURES

(71) Applicant: PAYPAL, INC., San Jose, CA (US)

(72) Inventors: Dan Yadlin, Tel-Aviv (IL); Ben Riva, Givatayim (IL); Alon Navon, Tel-Aviv (IL); Lev Pachmanov, Haifa (IL); Jonathan Katz, Silver Spring, MD (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,972

(22) Filed: Sep. 9, 2022

(65) Prior Publication Data
US 2023/0006838 A1 Jan. 5, 2023

Related U.S. Application Data

(63) Continuation of application No. 16/404,218, filed on May 6, 2019, now Pat. No. 11,444,779.

(Continued)

(51) Int. Cl.
*H04L 29/06* (2006.01)
*H04L 9/32* (2006.01)
(Continued)

(52) U.S. Cl.
CPC .............. *H04L 9/3247* (2013.01); *G06F 9/54* (2013.01); *H04L 9/085* (2013.01); *H04L 9/30* (2013.01);
(Continued)

(58) Field of Classification Search
CPC ......... H04L 9/3247; H04L 9/085; H04L 9/30; H04L 2209/38; H04L 2209/46; G06F 9/54

See application file for complete search history.

(56) References Cited

U.S. PATENT DOCUMENTS

| 9,411,982 B1 | 8/2016 | Dippenaar et al. |
| 9,449,177 B1 | 9/2016 | El Defrawy et al. |

(Continued)

FOREIGN PATENT DOCUMENTS

| WO | 2017145010 A1 | 8/2017 | |
| WO | WO-2017145016 A1 * | 8/2017 | ............. H04L 9/008 |

OTHER PUBLICATIONS

Damgard, et al., "A Generalization of Paillier's Public-Key System with Applications to Electronic Voting", International Journal of Information Security, vol. 9, Issue 6, Sep. 30, 2010, pp. 371-385.

(Continued)

*Primary Examiner* — John B King
(74) *Attorney, Agent, or Firm* — Haynes and Boone, LLP

(57) ABSTRACT

A system and method for securing application programming interface (API) requests using multi-party digital signatures. The method includes generating, by a first system, at least one first secret share of a plurality of secret shares based on an API secret, wherein the plurality of secret shares includes the at least one first secret share and at least one second secret share, wherein the at least one second secret share is generated by at least one second system; and signing, by the first system, an API request using the at least one first secret share, wherein the API request is further signed by the at least one second system using the at least one second secret share, wherein the API request is signed without revealing any of the at least one first secret share to the at least one (Continued)

second system and without revealing any of the at least one second secret share to the first system.

20 Claims, 4 Drawing Sheets

Related U.S. Application Data

(60) Provisional application No. 62/713,834, filed on Aug. 2, 2018.

(51) Int. Cl.
*H04L 9/08* (2006.01)
*G06F 9/54* (2006.01)
*H04L 9/30* (2006.01)
*H04L 9/00* (2022.01)

(52) U.S. Cl.
CPC ............ *H04L 9/50* (2022.05); *H04L 2209/46* (2013.01); *H04L 2209/56* (2013.01)

(56) References Cited

U.S. PATENT DOCUMENTS

| | | | |
|---|---|---|---|
| 10,084,596 | B1 | 9/2018 | Triandopoulos et al. |
| 11,019,068 | B2* | 5/2021 | Rossman ............ H04L 63/0876 |
| 2004/0103276 | A1 | 5/2004 | Jing et al. |
| 2004/0117649 | A1* | 6/2004 | Whyte .................. H04L 9/0891 |
| | | | 380/286 |
| 2006/0190734 | A1 | 8/2006 | Spitz |
| 2009/0217034 | A1 | 8/2009 | Sudia et al. |
| 2013/0024364 | A1 | 1/2013 | Shrivastava et al. |
| 2014/0052617 | A1 | 2/2014 | Chawla et al. |
| 2015/0262139 | A1 | 9/2015 | Shtylman |
| 2015/0262171 | A1 | 9/2015 | Langschaedel et al. |
| 2016/0294550 | A1 | 10/2016 | French et al. |
| 2017/0104588 | A1 | 4/2017 | Camenisch et al. |
| 2017/0149572 | A1 | 5/2017 | Wallrabenstein |
| 2017/0277831 | A1 | 9/2017 | Ruff et al. |
| 2018/0041484 | A1 | 2/2018 | Gifford et al. |
| 2018/0176013 | A1 | 6/2018 | Cheng et al. |
| 2018/0212763 | A1* | 7/2018 | Camenisch ............. H04L 9/085 |
| 2018/0241565 | A1 | 8/2018 | Paolini-Subramanya et al. |
| 2018/0278746 | A1 | 9/2018 | Yacov et al. |
| 2018/0357427 | A1 | 12/2018 | Lindell et al. |
| 2018/0359097 | A1 | 12/2018 | Lindell |
| 2018/0365396 | A1 | 12/2018 | Rucker |
| 2018/0367298 | A1 | 12/2018 | Wright et al. |
| 2018/0367316 | A1 | 12/2018 | Cheng et al. |
| 2019/0074979 | A1 | 3/2019 | Xu et al. |
| 2019/0222414 | A1 | 7/2019 | Pe'er et al. |
| 2019/0245857 | A1 | 8/2019 | Pe'er et al. |
| 2019/0280857 | A1 | 9/2019 | Mishli et al. |
| 2019/0303620 | A1 | 10/2019 | Jacobs, II |
| 2019/0347290 | A1 | 11/2019 | Yang |
| 2020/0044861 | A1 | 2/2020 | Buldas et al. |
| 2020/0074450 | A1 | 3/2020 | Fletcher et al. |
| 2020/0145231 | A1 | 5/2020 | Trevethan |
| 2020/0213113 | A1 | 7/2020 | Savanah et al. |
| 2020/0374113 | A1 | 11/2020 | Noam et al. |
| 2021/0036841 | A1 | 2/2021 | Craige et al. |
| 2021/0089676 | A1 | 3/2021 | Ford et al. |
| 2021/0119781 | A1 | 4/2021 | Liu et al. |
| 2021/0152371 | A1 | 5/2021 | Fletcher et al. |

OTHER PUBLICATIONS

Damgard, et.al., "A Length-Flexible Threshold Cryptosystem with Applications", BRICS Report Series-RS-03-16, ISSN 0909-0878, Mar. 2003, pp. 1-34.

Feldman, Paul, "A Practical Scheme for Non-Interactive Verifiable Secret Sharing", In Proceedings of the 28th Annual Symposium on Foundations of Computer Science (FOCS), 1987, pp. 427-438.

Gennaro, et al., "Threshold-optimal DSA/ECDSA Signatures and an Application to Bitcoin Wallet Security", City College, City University of New York, 2016, pp. 1-42.

Hazay, et al., "Efficient RSA Key Generation and Threshold Paillier in the Two-Party Setting", In Cryptographers Track at the RSA Conference, 2012, pp. 313-331.

Poupard, et al., "Shorts Proofs of Knowledge For Factoring", In International Workshop on Public Key Cryptography—Springer-Verlag Berlin Heidelberg, 2000, pp. 147-166.

Huang, et. al., "Amortizing Garbled Circuits", International Association for Cryptologic Research, Part II, LNCS 8617, 2014, pp. 458-475.

Kolesnikov, et. al., "Improved Garbled Circuit: Free XOR Gates and Applications", Bell Laboratories, 2008, pp. 1-12.

Lindell et. al., "Blazing Fast 2PC in the Offline/Online Setting with Security for Malicious Adversaries", Department of Computer Science, Bar-Ilan University, Israel, Jun. 21, 2016, pp. 1-32.

Lindell, et. al., "Cut-and-Choose Yao-Based Secure Computation in the Online/Offline and Batch Settings", Department of Computer Science—Bar-Ilan University, 2013, pp. 1-18.

Rindal, et. al., "Faster Malicious 2-Party Secure Computation with Online/Offline Dual Execution", 25th USENIX Security Symposium, Aug. 2016, pp. 297-314.

Wang, et. al., "Faster Secure Two-Party Computation in the Single-Execution Setting", Eurocrypt 2017, Aug. 7, 2017, pp. 1-26.

Zahur, et. al., "Two Halves Make a Whole: Reducing Data Transfer in Garbled Circuits Using Half Gates", Air Force of Scientific Research, Grant CCF-1149647, Jan. 12, 2015, pp. 1-22.

* cited by examiner

TECHNIQUES FOR SECURING APPLICATION PROGRAMMING INTERFACE REQUESTS USING MULTI-PARTY DIGITAL SIGNATURES

CROSS-REFERENCE TO RELATED APPLICATIONS

This application is a continuation of U.S. patent application Ser. No. 16/404,218, filed May 6, 2019, which claims the benefit of U.S. Provisional Application No. 62/713,834, filed Aug. 2, 2018, the contents of which are hereby incorporated by reference in their entirety.

TECHNICAL FIELD

The present disclosure relates generally to application programming interface requests, and more specifically to securing application programming interface requests.

BACKGROUND

An application programming interface (API) is a set of definitions, protocols, and tools used for allowing communication among applications. Using APIs simplifies programming by only exposing objects and actions needed by application developers. Calls to APIs are referred to as API requests. These API requests may be used to obtain access to target services and, therefore, can present cyber security threats related to unauthorized access of data.

One existing solution for securing APIs includes using a symmetric key (API secret) to validate a requestor program that sends an API request and by forcing the requestor program to sign API requests. A digital signature is a set of algorithms and encryption protocols utilized to verify the authenticity of a message contents. Each entity's identity is determined by an API token (sometimes referred to as an API key). When the requestor program asks a program of the service provider to receive access to the API, the service provider program issues the API token and the API secret and sends them to the requestor program.

Once the API secret and tokens have been issued, the requestor program can use them as long as they are valid. More specifically, the API secret may be used to sign a request by creating a hash of the content of the API request that can only be validated by the system hosting the requested operation. The API token is exposed in the request. This is usually done through a secure channel.

By identifying the requestor program, use of the API can be tracked and access can be controlled accordingly by the API service provider. For example, actions may be restricted based on the source of the request (e.g., based on a level of access permitted for a particular user using the requesting program), or sources issuing an unusually high number of requests may be blocked. By using a secret to sign the request, the request may be authenticated by the service provider to validate that the requestor program is authentic.

FIG. 1 shows an example network diagram 100 utilized to describe an existing solution for managing API requests. In the example block diagram 100, an API service requestor device 110 communicates with an API service provider device 120 in order to access services delivered by the API service provider device 120. The API service provider device 120 may further communicate with one or more data stores 130 including data used for providing such operations or other services.

The API service requestor device 110 is a device executing a requestor program 115 that is configured to access API services delivered by the API service provider device 120. The API services utilize APIs to facilitate communications. The API services are secured by requiring the API service requestor device 110 to sign API requests. The API service requestor device 110 and the API service provider device 120 may communicate via one or more networks (not shown).

Although using cryptographic techniques present some benefits in securing API access, insecurities related to the tokens and secrets used for such cryptographic techniques may allow malicious entities who have successfully infiltrated the requestor's machine to receive unauthorized access through APIs. In particular, when a system storing the API token and API secret is breached. An adversary gaining access to the token and secret can issue a call, and the server will have no way of differentiating the attacker from the authenticated legitimate user. The potential amount of exposure has increased due to cross-entity API services such as SaaS service providers.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing application programming interface (API) requests using multi-party digital signatures. The method comprises generating, by a first system, at least one first secret share of a plurality of secret shares based on an API secret, wherein the plurality of secret shares includes the at least one first secret share and at least one second secret share, wherein the at least one second secret share is generated by at least one second system; and signing, by the first system, an API request using the at least one first secret share, wherein the API request is further signed by the at least one second system using the at least one second secret share, wherein the API request is signed without revealing any of the at least one first secret share to the at least one second system and without revealing any of the at least one second secret share to the first system.

Certain embodiments disclosed herein also include a non-transitory computer readable medium having stored thereon causing a processing circuitry to execute a process, the process comprising: generating, by a first system, at least one first secret share of a plurality of secret shares based on an API secret, wherein the plurality of secret shares includes the at least one first secret share and at least one second secret share, wherein the at least one second secret share is generated by at least one second system; and signing, by the first system, an API request using the at least one first secret share, wherein the API request is further signed by the at least one second system using the at least one second secret share, wherein the API request is signed without revealing any of the at least one first secret share to the at least one second system and without revealing any of the at least one second secret share to the first system.

Certain embodiments disclosed herein also include a system for securing application programming interface (API) requests, comprising: a processing circuitry; and a memory, the memory containing instructions that, when executed by the processing circuitry, configure the system to: generate at least one first secret share of a plurality of secret shares based on an API secret, wherein the system is a first system, wherein the plurality of secret shares includes the at least one first secret share and at least one second secret share, wherein the at least one second secret share is generated by at least one second system; and sign an API request using the at least one first secret share, wherein the API request is further signed by the at least one second system using the at least one second secret share, wherein the API request is signed without revealing any of the at least one first secret share to the at least one second system and without revealing any of the at least one second secret share to the first system.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1:
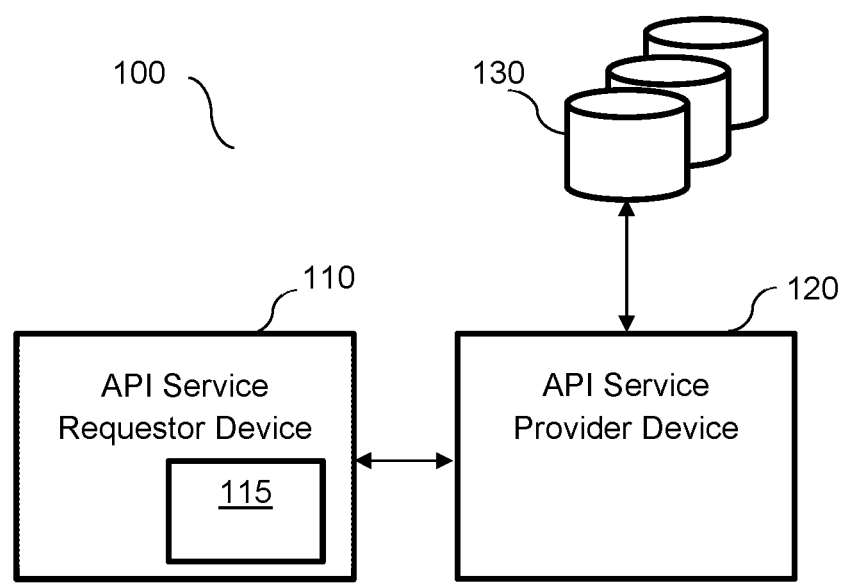
FIG. 1 is a network diagram utilized to describe an existing solution for managing API requests.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The security challenges related to application programming interface (API) requests warrant new solutions for securing APIs by the requesting party. Insecurities related to API secrets present challenges for entities seeking to receive services using APIs. Lost or stolen API secrets may allow unauthorized access to the API offered by a service provider without the service provider being able to identify that the requesting party has been breached. This may lead to data leak or to unauthorized financial operations carried out by the attacker depending on the service provided through APIs by the service provider. Although existing solutions provide some techniques for storing secrets securely, such solutions still maintain complete copies of those secrets that, if compromised, can result in unauthorized access. Additionally, APIs are intended to be used by machines who automatically issue requests. Those machines almost always possess full access to the API token and API secret.

The various disclosed embodiments provide techniques for securing API requests by using multi-party digital signatures to sign API requests. In particular, the disclosed embodiments address the above-noted challenges by creating API secrets used for signing API requests in a distributed way through two or more portions (hereinafter referred to as "shares") and using the distributed shares by systems of two or more different entities, or parties, to sign an API request. Each system is owned by a different entity. An interactive protocol (e.g., Secure Multiparty Computation or Threshold Digital signature) is run between the systems. Each system generates and stores one or more shares such that the shares collectively enable the signing of an API request as if it was signed by the corresponding API secret but cannot be used for determining the API secret while maintained separately. The API secret never materializes in any of the protocols.

One or more of the systems having the distributed shares determines whether an API request meets a signing policy before the shares are used to sign the API request. A system that validated the API request with respect to the signing policy engages in the signing protocol to sign the API request when the API request has been validated. At least some of the shares are used to sign the API request such that a system lacking the necessary number of shares is unable to sign the API request in accordance with the signing policy. The signing policy is a security policy that aligns the number of users approving the API request to the risk the API request might pose. The protocol only works if a minimum number of shares of the distributed API secret are present.

In an example implementation, an API secret that is generated by an API service provider is to be protected. The API secret is sent to an API service requestor device as part of a service utilizing APIs. The secret is split, in the API service requestor device, into two shares and then one of the shares is securely sent to one or more other parties such that the secret is split between systems of two or more parties. Each system secures its corresponding share. The two or more parties can be, for example, an API service requestor party and multi-party computation (MPC) service provider party (i.e., an entity that owns or operates a MPC system that is configured to secure API requests using MPC as described herein). The MPC system validates an API request by determining whether the signing policy is met. When the API request is validated, the MPC system will engage in a MPC signing protocol using its share with the other parties. The signing policy requires at least a portion of the shares and may be configured by a system of the API service requestor. The share stored in each system may be rotated every hour or day such that shares are only valid for a limited period of time and the likelihood of collecting all shares before the next rotation is significantly reduced. The share rotation is also performed through an interactive multiparty computation protocol.

MPC allows parties to jointly compute a function over their respective inputs while keeping those inputs private. Thus, utilizing MPC for the signing protocol allows for utilizing the shares secretly and independently by each participating party while ensuring that the shares collectively enable signing transactions without revealing the API secret or shares by one party to the others. Throughout this process, no portion of the shares of one party is revealed to the other party.

In another example implementation, the MPC service provider can have 3 shares each stored on a different cloud IaaS provider, while the API service requestor can have 2 shares, one stored on employee devices and one stored on a backend. The number of shares can be higher than two and the number of required shares to sign can be lower than the number of shares.

In an embodiment, multiple sets of shares may be created by engaging a protocol to re-split the original API secret for a total of two or more times being split. Each set of shares includes n shares (where n is an integer value greater than or equal to 2) and requires k out of n of its respective shares to be complete for signing purposes (where k is an integer value that with $1<k<=n$).

Different sets of shares may be distributed differently. For example, each set may be assigned to a different employee or other user such that a user device of each employee stores a different share from that of other employees and a corresponding service provider system stores a different share for each employee. Further, if a share of a first set of shares is lost (e.g., a share assigned to a first employee is deleted or corrupted, etc.), new shares may be created using other existing shares. This allows for recovery of the API secret without actually reconstructing or generating the API secret. In a further embodiment, the shares held by the API service requestor cannot be used to reconstruct the API secret without the shares safeguarded by the MPC system.

The disclosed embodiments may include various protocols utilized to facilitate the functions described herein. In an example implementation, securing the API secrets includes splitting the API secret created by the API service provider into several shares, a digital signature protocol, and a share addition protocol. The share addition protocol allows for creating new shares based on existing shares and may be utilized to add a new user or to rotate shares.

The disclosed embodiments reduce the complexity as compared to utilizing multiple API secrets while being more secure than use of a single API secret. In particular, theft of a single share or the compromising of only one system storing shares will not lead to unauthorized signing or exposure of API secrets. Further, the disclosed embodiments provide a fast and flexible solution that may be delivered as a software only cloud service, thereby allowing for efficient scaling and auditing. The service may be provided with minimal interference with user networks and systems.

In addition to the aforementioned advantages, shares may be rotated among entities to prevent collecting API secrets via the shares. Shares may be rotated periodically, for example every hour or day. The shares may be stored on separate networks, thereby drastically decreasing the likelihood of simultaneously infiltrating the networks to retrieve all shares. Shares may be rotated without needing to change the latent API secret. Additionally, API secrets may be split using arbitrarily complex schemes to increase security.

Additionally, in some embodiments, the signing policy may define additional requirements for signing API requests. The additional requirements may differ, for example, depending on a requested operation (i.e., some operations may require more stringent requirements), a type of the operation, time of day, and the like. Such requirements may require approval by other entities (e.g., managers, upper management, administrators, etc.), particular authentication methods (e.g., password, biometric authentication, multi-factor authentication, device certificate, one-time password, etc.), both, and the like. The additional requirements provide a flexible policy scheme that increases security of API requests and minimizes harm caused by malicious entities.

For example, an attacker that gains access to an employee's device may be unable to access operations that expose sensitive data because the attacker cannot gain approval from a manager or administrator. The signing policy may also ensure authenticity of the request using multi-factor authentication, for example by sending an email to the requesting user to validate the request.

Figure 2:
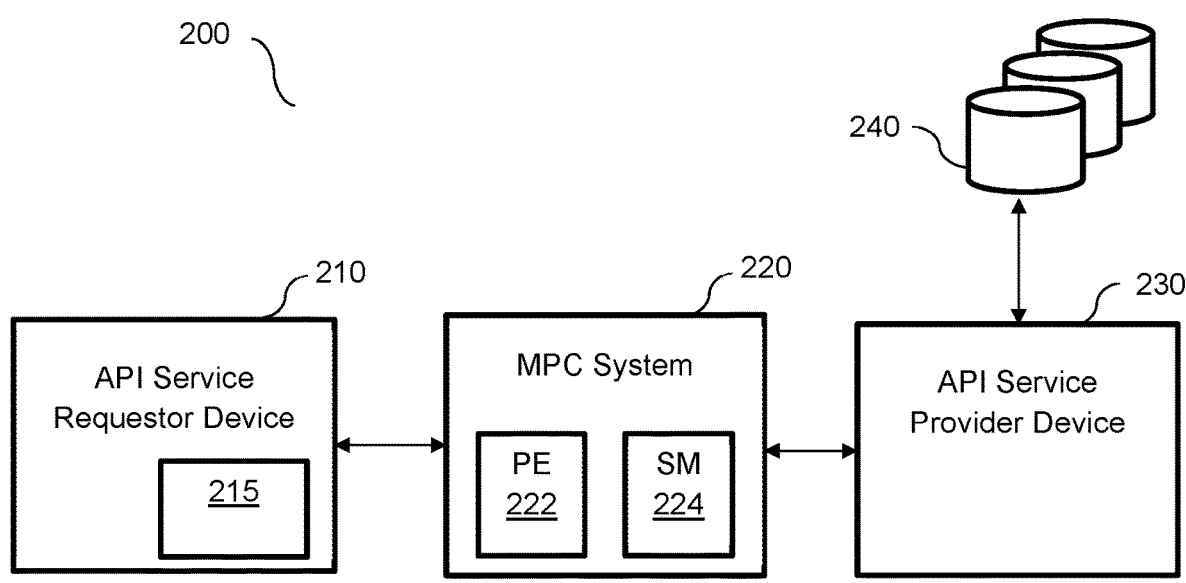
FIG. 2 is a network diagram utilized to describe an example implementation for securing API requests via multi-party computation according to an embodiment.

FIG. 2 shows an example network diagram 200 utilized to describe various disclosed embodiments. In the example network diagram 200, an application programming interface (API) service requestor device 210 accesses operations of services via an API service provider device 230. To this end, the API service requestor device 210 communicates with a multi-party computation (MPC) system 220 to distribute shares of an API secret used for signing API requests to the API service provider device 230.

In an example implementation, the API service requestor device 210 may communicate with the MPC system 220 and the MPC system 220 may communicate with the API service provider device 230 over one or more networks that may include, but are not limited to, a wireless, cellular or wired network, a local area network (LAN), a wide area network (WAN), a metro area network (MAN), the Internet, the worldwide web (WWW), similar networks, and any combinations thereof.

The API service requestor device 210 may be, but is not limited to, a server; a user device such as a personal computer, a laptop, a tablet computer, a smartphone, a wearable computing device; or any other device configured to make and sign API requests in accordance with the embodiments disclosed herein. The API service requestor device 210 may be deployed in a local network (not shown) such as, for example, a corporate network of a company.

The API service provider device 230 is a server or other system hosting one or more applications and utilizing one or more APIs to deliver services or functions of the hosted applications. In an example implementation, the API service provider device 230, the MPC system 220, or both, are deployed in a cloud computing platform. Thus, the API service provider device 230 may be utilized for providing cloud computing services.

The APIs used by the API service provider device 230 include definitions required for accessing services provided by applications hosted thereon. Such definitions may include, but are not limited to, routines, data structures, object classes variables, remote calls, and the like. The APIs are used to communicate with external systems (e.g., the API service requestor device 210) to receive and respond to requests for operations or other services hosted by the API service provider device 230. The API service provider device 230 may further communicate with one or more data stores 240 including data used for providing such operations or other services.

The API service requestor device 210 is configured to create and store a first share of an API secret used for signing API requests to the API service provider device 230. The API service requestor device 210 may include a software development kit (SDK). In some implementations, the API service requestor device 210 is configured to perform an authentication to verify that a user operating the API service requestor device 210 is authorized to make particular API requests.

Once the user is authenticated, the API service requestor device 210 communicates with the MPC system 220. To this end, an interactive protocol is run between the API service requestor device 210 and the MPC system 220. During this process, the API secret is not exposed over the networks used for communication. Additionally, an insider having access to a network (not shown) in which the API service requestor device 210 is deployed can at best access shares stored on systems in that network but not those shares stored on external systems and, specifically, on the MPC system 220.

In an embodiment, the MPC system 220 is configured with a policy engine (PE) 222 and a share manager (SM) 224. The policy engine 222 is configured to determine whether a signing policy is met at least based on shares stored by the API service requestor device 210 and by the MPC system 220. The policy engine 222 may further be configured to determine whether the signing policy is met based on one or more additional requirements. The additional requirements may indicate other entities (not shown) that must approve an API request, required authentication protocols (e.g., multi-factor authentication, use of particular devices, biometric authentication, combinations thereof, etc.), both, and the like.

The share manager 224 is configured to create shares. When the policy engine 222 determines that an API request is authenticated and should therefore be signed, it notifies the share manager 224 to participate in the MPC. The MPC may fail if the other parties (e.g., the API service requestor device 210) fail to deliver their shares. When sufficient shares are present, the MPC system 220 signs the API request via the MPC interactive protocol using its respective shares.

In an embodiment, each share that is held by a party is not revealed to the other party or parties, and is not revealed to any external third parties. To this end, each share generated by one system is only exposed to that system and is not sent, shared, or otherwise revealed to another system. In a further embodiment, no portion of any share is exposed to any parties that the entire share is not exposed to (i.e., 0% of the share is exposed aside from being exposed to the system that generated the share), thereby ensuring that shares cannot be reconstructed based on exposed pieces. Since shares are only exposed to a single party, accessing only one party's shares will not allow a malicious entity to enable signing in accordance with the MPC signing protocol.

In an embodiment, further security measures may be provided to prevent malicious exposure of shares. To this end, each system generating a share may be configured such that they cannot send or otherwise provide shares (or portions thereof) to any external system (i.e., a system other than the system that generated the share). In other words, even if a malicious entity attempts to trick or otherwise cause a system to improperly expose its share, the system cannot do so.

The MPC system 220 may be, but is not limited to, a server or other system configured to perform various disclosed embodiments. Each of the API service requestor device 210 and the MPC system 220 may include, but is not limited to, a processing circuitry and a memory, the memory containing instructions that, when executed by the processing circuitry, configures the respective counterpart to perform a portion of the functions described herein. In particular, each portion includes at least generating one or more shares and using the respective shares to sign an API request. An example block diagram illustrating some components of the MPC system 220 is described further below with respect to FIG. 4.

It should be noted that FIG. 2 shows a single API service requestor device 210 and a single MPC system 220 merely for simplicity and without limiting the disclosed embodiments. Multiple API service requestor devices, MPC systems, or both, may be utilized, each storing one or more shares. Utilizing multiple MPC systems, for example such that each holds a different share that is required in every signature, allows for reducing the risk of one rogue system from unilaterally signing data. To this end, in an embodiment using multiple MPC systems, a consensus algorithm is utilized to agree on the policy in a way that would prevent a single point of failure.

It should also be noted that a single API service provider device 230 is shown in FIG. 2 merely for simplicity and that multiple API service provider devices may be equally utilized. Communications with applications or portions thereof hosted by the API service provider devices may be provided via an API exchange or other platform that hosts APIs from various operators without departing from the scope of the disclosure.

Figure 3:
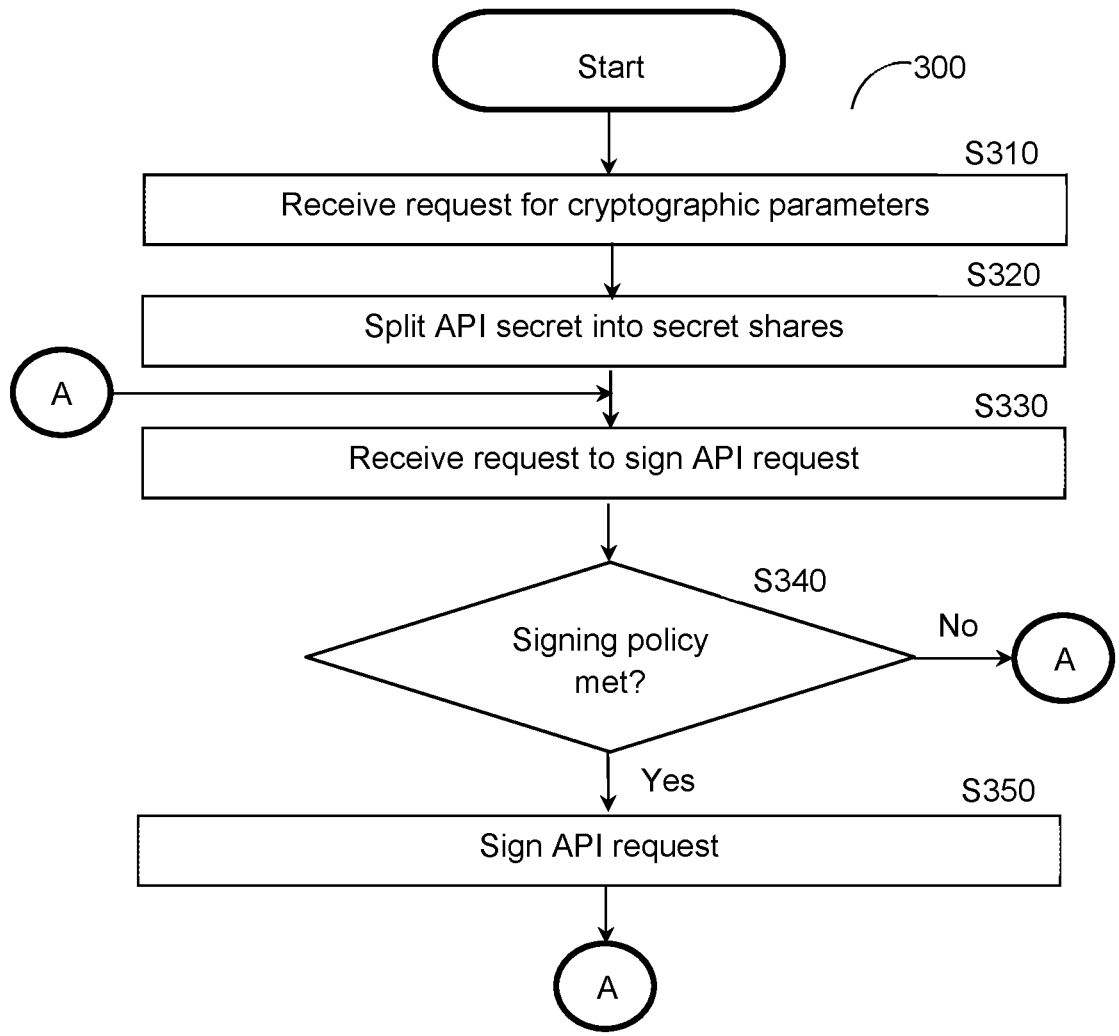
FIG. 3 is a flowchart illustrating a method for securing API requests via multi-party computation according to an embodiment.

FIG. 3 is an example flowchart 300 illustrating a method for securing digital signatures for signing API requests using multi-party digital signatures according to an embodiment. In an example implementation, the method may be performed by the MPC system 220.

At S310, a request for cryptographic parameters to be used for API requests is received. The request may be received from, for example, an API service requestor device (e.g., the API service requestor device 210, FIG. 2).

At S320, secret shares are generated based on an API secret created by the API service provider. The secret shares are created such that two or more shares collectively form the API secret delivered by the service provider. To this end, when data is signed using each of the shares, at least k shares out of a total number n of shares is needed to successfully sign the data, where k and n are both integers having a value greater than or equal to 2 and k is less than or equal to n. To this end, the shares are generated by two or more systems, with each system representing a party. As a non-limiting example, each of the MPC system 220 and the API service provider device 230 generates a portion of the shares.

It should be noted that each party generates one or more secret shares and that none of the parties knows the full API secret. As a non-limiting example, if a customer device (e.g., the API service requestor device 210) and a service provider system (e.g., the MPC system 220) will store the shares, at least two shares are created. As another non-limiting example, if four systems will store the shares, at least four shares are created. The system of each party creates one or more of the shares separately and independently from the other systems. As a non-limiting example, when the method of FIG. 3 is performed by the MPC system 220, the API service requestor device 210 separately generates one or more shares.

In another embodiment, S320 may include secure distributed generation of the same latent API secret multiple times such that two or more sets of shares are created, with each set of shares including two or more shares. Each set of shares may be used to sign and validate the data such that all shares of one of the sets are needed to sign the data. The scheme supports defining a threshold k in which k shares are needed out of the total number n of shares, where k is less than or equal to n. As a non-limiting example, 5 shares of an API secret are created among an API service requestor and a MPC service provider, with 2 to be generated by the API service requestor and 3 by the service provider. Any 4 of the 5 shares may be needed for access. As another non-limiting example, the API secret may be generated by 3 parties creating shares, for example an API service requestor, a MPC service provider, and a trusted third party.

At S330, a request to sign an API request is received. The request may be received from, for example, a device requesting a service that uses APIs (e.g., the API service requestor device 210, FIG. 1) when the API service requestor device requests an operation to be performed or other service to be delivered. The request at least includes the data to be signed (for example, an API request).

At S340, it is determined whether requirements of a signing policy have been met and, if so, execution continues with S350; otherwise, execution either terminates (not shown) or continues with S330 (shown). The signing policy includes rules for validating the authenticity. When the API request is validated, the system of the validating party (for example, the service provider) will use its respective predefined portion of the shares (or a portion of shares of a set of shares if the API secret is split into several sets) in order to sign the API request. The signing policy may further include additional requirements as described herein above. To this end, S340 may include communicating with other systems to, for example, prompt other users to provide authentication and approval for the transaction.

At S350, the shares are used to sign the API request. In an embodiment, the API request is signed using a distributed implementation of a digital signature algorithm (for example ECDSA/EdDSA/ED25519/HMAC), such that the full API secret is never reconstructed on any system. As non-limiting examples, such a digital signature algorithm may be ECDSA, Edwards-curve Digital Signature Algorithm (EdDSA), Ed25519, HMAC (for example, HMAC over SHA-512) and the like. The security of the protocol may be proven based on cryptographic assumptions (e.g., a discrete log).

It should be noted that steps S330 through S350 may be repeated with the same secret generated in S320 because the same secret can be used for signing multiple API requests.

It should also be noted that, in an embodiment, shares generated at S320 may be rotated in a way that is consistent with the API secret of the digital signature. Such rotation may be performed between any two or more parties that wish to refresh their secret shares. None of the shares are revealed in the process. The parties may proceed to S330 as if the shares were generated in S320.

Figure 4:
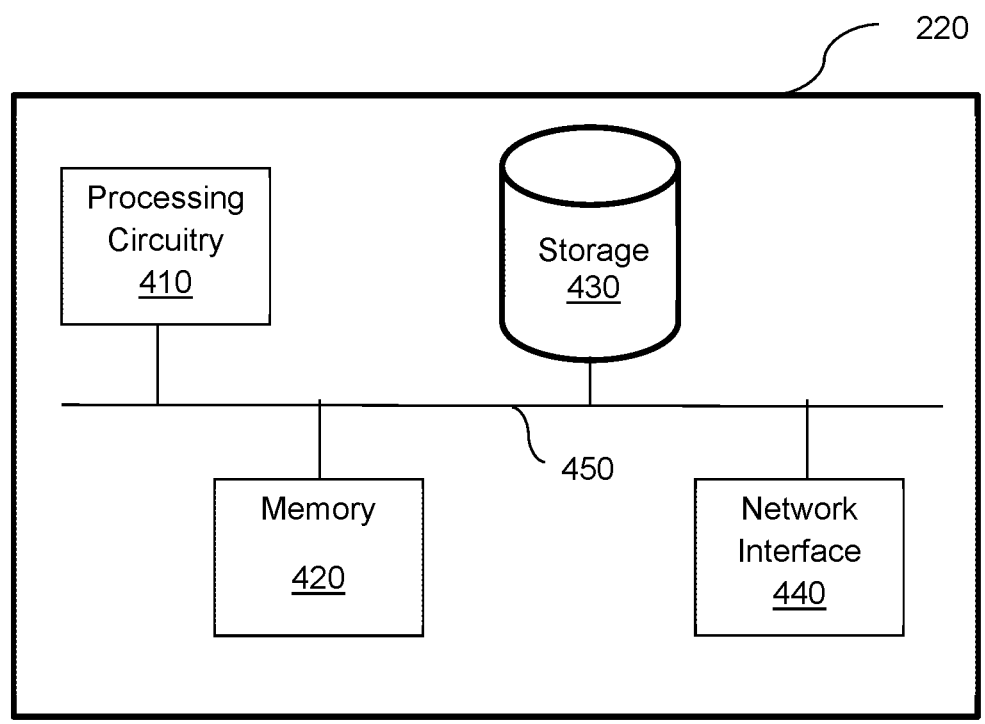
FIG. 4 is a block diagram of a system for securing API requests via multi-party computation according to an embodiment.

FIG. 4 is an example schematic diagram of the MPC system 220 according to an embodiment. The MPC system 220 includes a processing circuitry 410 coupled to a memory 420, a storage 430, and a network interface 440. The components of the MPC system 220 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), encrypted verifiable hardware, secure elements, secure verifiable enclaves within microprocessors such as Intel© SGX, and the like, or any other hardware logic components that can perform calculations or other manipulations of information.

In an example implementation, the entire MPC protocol may be implemented using software guard extensions (SGX). To this end, instructions for performing the disclosed embodiments may be stored in a private region of memory, where the private region of memory includes data used for signing and providing signed API requests. The data in the private region of memory is inaccessible to processes outside the private region of memory.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, configure the processing circuitry 410 to perform at least some of the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the MPC system 220 to communicate with, for example, the API service requestor device 210, the API service provider device 230, and the like, for purposes such as, but not limited to, receiving API request data, sending at least partially signed API requests, and the like.

It should be understood that the embodiments described herein are not limited to the specific architecture illustrated in FIG. 4, and other architectures may be equally used without departing from the scope of the disclosed embodiments. Additionally, other systems may be similarly configured to create shares based on API secrets and to sign transactions using the created shares.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
    accessing, by a first system, a digital signing protocol for an application programming interface (API) secret having a plurality of secret shares distributed over a plurality of computing systems;
    determining, by the first system based on the digital signing protocol, an update operation for the plurality of secret shares;
    generating, by the first system, a first secret share of the plurality of secret shares based on the update operation, wherein the plurality of secret shares includes the first secret share and a second secret share generated by a second system;
    determining, by the first system, a signing policy including a first requirement that a minimum number of secret shares of the plurality of secret shares are available to sign an API request;
    determining, by the first system based on the signing policy, whether the second secret share is required to be updated for the minimum number of secret shares available to sign the API request; and
    providing, by the first system, the first secret share for a processing of the API request based on the determining whether the second secret share is required to be updated.

2. The method of claim 1, further comprising:
    updating, by the first system, the first secret share of the plurality of secret shares on a periodic rolling basis based on the signing policy.

3. The method of claim 2, wherein the updating comprises:
    determining, by the first system, that the second secret share is required to be updated; and
    requesting, by the first system from the second system, that the second system update the second secret share based on the signing policy.

4. The method of claim 1, wherein the signing policy comprises a minimum number of the plurality of secret shares required for different ones of a plurality of signing authorizations.

5. The method of claim 4, wherein the different ones of the plurality of signing authorizations are associated with transaction payment limits for the signing policy.

6. The method of claim 5, wherein each of the transaction payment limits is associated with an amount of cryptocurrency utilized during transactions requiring the signing policy.

7. The method of claim 1, wherein the API secret comprises an encryption key associated with an amount of transferrable cryptocurrency using one or more private keys.

8. The method of claim 1, further comprising:
    validating, by the first system, the API request based on the signing policy and the minimum number of secret shares available to sign the API request.

9. The method of claim 1, further comprising:
    signing, by the first system, the API request using the first secret share, wherein the API request is further signed by the second system using the second secret share, and wherein the API request is signed without revealing any of the first secret share to the second system.

10. A first system comprising: a non-transitory memory; and
    one or more hardware processors coupled to the non-transitory memory and configured to read instructions from the non-transitory memory to cause the first system to perform operations comprising:
        accessing a digital signing protocol for an application programming interface (API) secret having a plurality of secret shares distributed over a plurality of computing systems;
        determining, based on the digital signing protocol, an update operation for the plurality of secret shares;
        generating a first secret share of the plurality of secret shares based on the update operation, wherein the plurality of secret shares includes the first secret share and a second secret share generated by a second system;
        determining a signing policy including a first requirement that a minimum number of secret shares of the plurality of secret shares are available to sign an API request;
        determining, based on the signing policy, whether the second secret share is required to be updated for the minimum number of secret shares available to sign the API request; and
        providing the first secret share for a processing of the API request based on the determining whether the second secret share is required to be updated.

11. The first system of claim 10, wherein the operations further comprise:
    updating the first secret share of the plurality of secret shares on a periodic rolling basis based on the signing policy.

12. The first system of claim 11, wherein the updating comprises:
    determining that the second secret share is required to be updated; and
    requesting, from the second system, that the second system update the second secret share based on the signing policy.

13. The first system of claim 10, wherein the signing policy comprises a minimum number of the plurality of secret shares required for different ones of a plurality of signing authorizations.

14. The first system of claim 13, wherein the different ones of the plurality of signing authorizations are associated with transaction payment limits for the signing policy.

15. The first system of claim 14, wherein each of the transaction payment limits is associated with an amount of cryptocurrency utilized during transactions requiring the signing policy.

16. The first system of claim 10, wherein the API secret comprises an encryption key associated with an amount of transferrable cryptocurrency using one or more private keys.

17. The first system of claim 10, wherein the operations further comprise:
validating, by the first system, the API request based on the signing policy and the minimum number of secret shares available to sign the API request.

18. A non-transitory machine-readable medium having stored thereon machine-readable instructions executable to cause a machine to perform operations comprising:
accessing, by a first system, a digital signing protocol for an application programming interface (API) secret having a plurality of secret shares distributed over a plurality of computing systems;
determining, by the first system based on the digital signing protocol, an update operation for the plurality of secret shares;
generating, by the first system, a first secret share of the plurality of secret shares based on the update operation, wherein the plurality of secret shares includes the first secret share and a second secret share generated by a second system;
determining, by the first system, a signing policy including a first requirement that a minimum number of secret shares of the plurality of secret shares are available to sign an API request;
determining, by the first system based on the signing policy, whether the second secret share is required to be updated for the minimum number of secret shares available to sign the API request; and
providing, by the first system, the first secret share for a processing of the API request based on the determining whether the second secret share is required to be updated.

19. The non-transitory machine-readable medium of claim 18, wherein the operations further comprise:
updating, by the first system, the first secret share of the plurality of secret shares on a periodic rolling basis based on the signing policy.

20. The non-transitory machine-readable medium of claim 19, wherein the updating comprises:
determining, by the first system, that the second secret share is required to be updated; and
requesting, by the first system with the second system, that the second system update the second secret share based on the signing policy.

* * * * *